July 19, 1960

J. ENDRES 2,945,618

FREE-PISTON COMPRESSORS

Filed June 20, 1957

INVENTOR.
JOHANN ENDRES
BY

INVENTOR.
JOHANN ENDRES

United States Patent Office 2,945,618
Patented July 19, 1960

2,945,618

FREE-PISTON COMPRESSORS

Johann Endres, Wackersberg, near Bad Tolz, Germany, assignor to The Messerschmitt A.G., Augsburg, Germany Filed June 20, 1957, Ser. No. 666,843

Claims priority, application Germany Dec. 15, 1956

7 Claims. (Cl. 230—56)

This invention relates to a system including a free-piston compressor and a plurality of radially disposed free piston engines. Free piston compressors have become known from Pescara's and Junkers' designs. However, the performance of such prior art compressors is limited in that provision is made for only one combustion chamber in the centre of the unit because the return stroke of the pistons must be brought about by the re-expansion of the previously compressed air. The volumetric delivery efficiency of the compressor part of the unit does not therefore exceed about 30%.

It is an object of the present invention to provide a system including a free-piston compressor of compact arrangement and of very high performance which in conjunction with gas-turbines will facilitate the construction of economically important power generating plant of high output and high efficiency capable of meeting present-day industrial requirements, particularly in the metallurgical, mining, and shipbuilding industries as well as in the construction of aircraft.

The value of stationary gas turbine power plants as hitherto used is impaired by the fact that the low pressures at which they work reduce their efficiencies, and that the useful output of the turbine is limited to about one-third of the power actually delivered to the shaft because the remainder is consumed by the power required for driving the turbo-compressors.

The efficiency and output of the gas turbine is considerably increased if, as proposed by the invention, a high performance and high efficiency diesel piston compressor is introduced into the cycle in the high pressure stage, the piston compressor being constructed to have the required capacity for handling a considerable volume of air.

According to the system comprising the present invention this fundamental idea is realised by providing a plurality of double-acting free-piston engines coupled to a double-acting, opposed-motion, free-piston compressor.

A further feature of the invention resides in that several double-acting, opposed-motion free-piston engines are arranged radially and equally spaced, with axially parallel cylinders, about a central free-piston compressor, the engine pistons being coupled to the associated compressor piston by means of radial coupling elements, and each of the free-piston engines thus arranged in a circle having two pistons with one inner and two outer combustion chambers.

The invention provides also appropriate arrangements for the control of air admission and air delivery to ensure that large volumes of air can be passed through the free-piston compressor and properly controlled. Air admission and air delivery control systems of the hitherto conventional type are not able to meet the exacting demands made upon them by high-capacity free-piston compressors.

The principal feature of this part of the invention consists in that through longitudinal ports in the compressor cylinder the air enters a cavity formed between two motion-coupled piston heads of a double-acting compressor piston and that the air is thence admitted into the compression chambers inside the cylinders through air admission control means disposed in the piston crowns.

Another aspect of the invention resides in the synchronisation of the free-piston compressors.

Synchronising devices for free-piston compressors are also already known from Pescara's and Junkers' designs. These consist of two racks which are positively axially motion controlled by the opposed-motion pistons and which mesh with a common pinion located in the centre of the unit. They therefore ensure synchronism of the piston movements. However when providing only one combustion chamber in the middle of the unit no major differential forces apart from the friction encountered by the moving elements of the unit arise and need compensation, the simple form of synchronising gear incorporated in Pescara's and Junkers' designs is quite sufficient.

The synchronising means employed in the present invention avoid the drawbacks inherent in the known method of synchronisation and its limited load-carrying capacity, the problem being solved by replacing the single pair of racks and pinion by a gearing actuated by the compressor pistons in such manner as to ensure synchronisation of the compressor pistons and of the engine pistons which are coupled therewith.

In the synchronising gear according to the present invention one or more (i.e. all) of the concentrically disposed free-piston engines is or are synchronised by the (single) synchronising gear of a centrally disposed free-piston compressor.

In free-piston compressors according to the invention a special problem is that of ensuring that the gas pressures in the compression chambers acting on the several pistons are equal, a result which can never be fully achieved in prior arrangements. Although the load created by pressure differentials is absorbed in the synchronising gear, arrangements are nevertheless required for ensuring the smooth operation of the compressor by substantially balancing the gas pressures acting on all the engine pistons. In double-acting, opposed-motion free-piston engines of drum-type construction with a centrally disposed compressor the invention therefore proposes substantially to equalise the pressures in the inner and outer combustion chambers.

One method the invention proposes to use for achieving this balance between the inner and outer combustion cylinders is to short-circuit those combustion chambers in the cylinders which work in synchronous cycles. Since in double-acting free-piston type engines the timing of the ignition in the inner and outer combustion chambers differs by 180° two operationally separate intercommunicating systems are employed to permit equalisation of pressures in the inner and outer combustion chambers.

In the drum-type construction in which the individual double-acting, opposed-motion units are arranged in a concentric bank the outer combustion chambers of each individual cylinder unit are therefore connected, and at the same time the outer combustion chambers in the same bank at either end of the whole unit as well as the inner combustion chambers are interconnected by an annular channel.

Embodiments of the invention are illustrated in the accompanying drawings by way of example. The invention must not be understood as being limited to these examples which merely serve to clarify the nature and the principal features of the invention. In these drawings.

Figure 1:
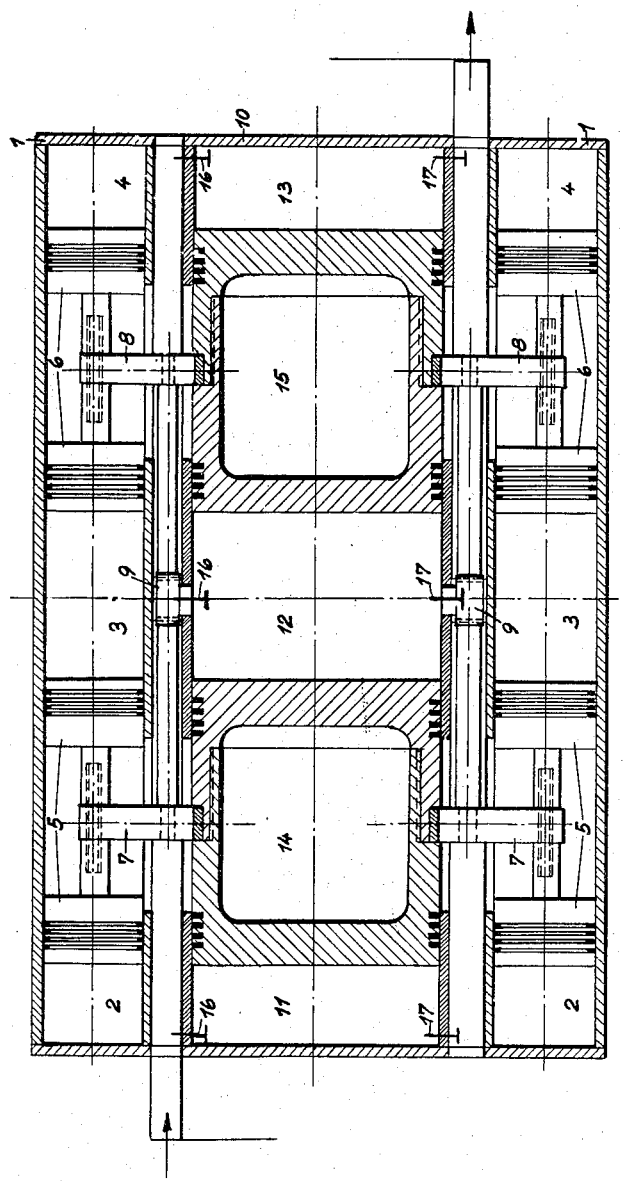
Fig. 1 is a longitudinal section of a compressor unit comprising two double-acting, opposed-motion engine and compressor pistons.
Figure 2:
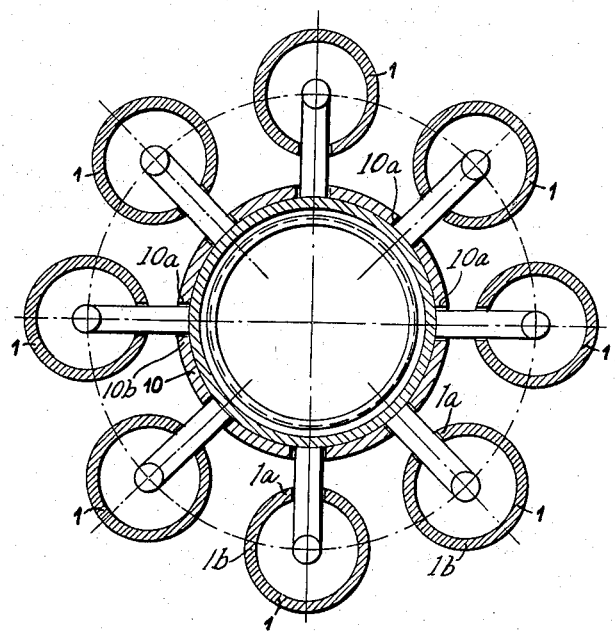
Fig. 2 is a cross section of the compressor unit.

With continuing reference to the drawing and with initial attention to the embodiment of the invention shown in Figs. 1 and 2, the system shown comprises a plurality of free-piston engines 1 with combustion chambers 2, 3 and 4 bounded by double pistons 5 and 6. These engines are double-acting and operate in opposed motion in a two-stroke cycle (preferably in a Diesel cycle). The engines 1 are equally spaced from each other and are radially disposed about a compressor 10. The piston motions produced by the combustion of the gases are transmitted by radial coupling elements 7 and 8 extending through slots 1a in the cylinders 1b and through slits 10a in the compressor wall 10b, synchronised by the element at 9, to the compressor pistons 14 and 15 disposed in the compressor 10 having the compression chambers 11, 12 and 13, air drawn in through the admission valves or elements 16 being compressed and expelled through outlet valves or elements 17. The compressor is likewise double-acting with pistons operating in opposed motion.

Fig. 2 illustrates a circular bank of engines 1 and the manner in which they are combined with the central free-piston compressor 10.

Figure 3:
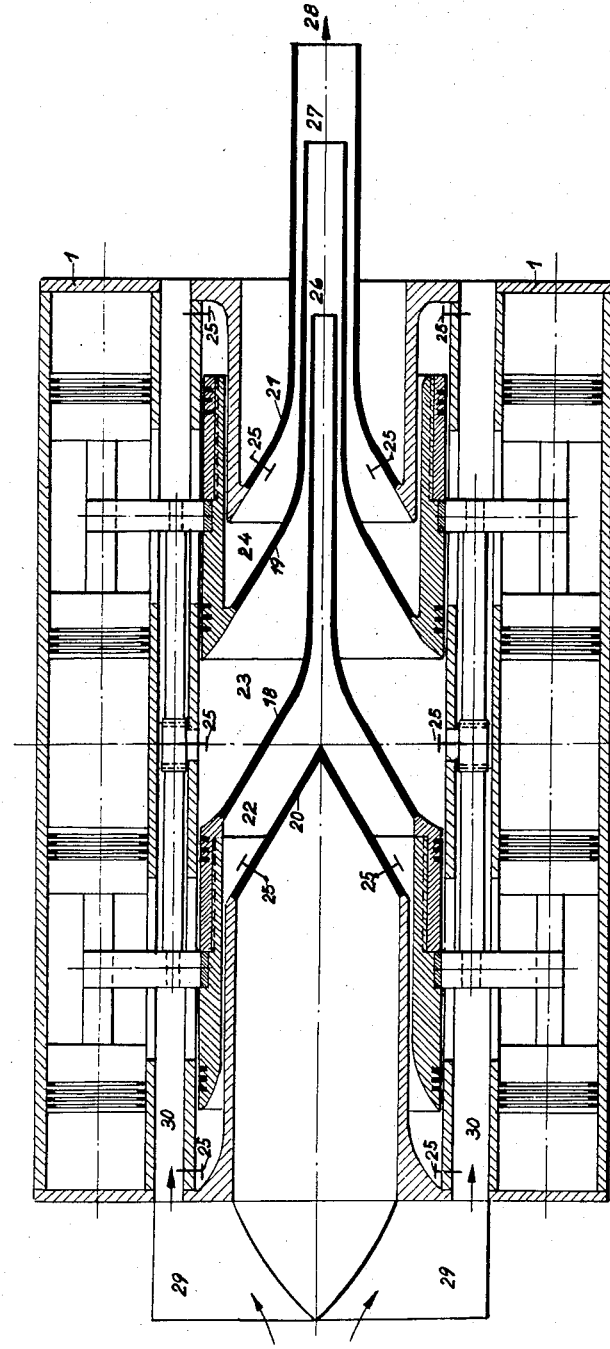
Fig. 3 is a longitudinal section of the compressor unit incorporating two double-acting opposed-motion nozzle pipe pistons.

Fig. 3 shows an arrangement which conforms in principle with that illustrated in Figs. 1 and 2, excepting that the compressor pistons are nozzle-pipe pistons.

These nozzle-pipe pistons 18 and 19 are actuated by the free-piston engines 1 and compress the air which has been drawn into the compression chambers 22, 23 and 24 formed between the pistons 18, 19 and the walls 20 and 21 respectively through the annular inlet elements 25, the air after being compressed being ejected through the nozzle pipes 26, 27 and 28.

The air flows into the air intake 29 through an annular duct 30 in which the admission elements 25 of the compressor are arranged.

Figure 4:
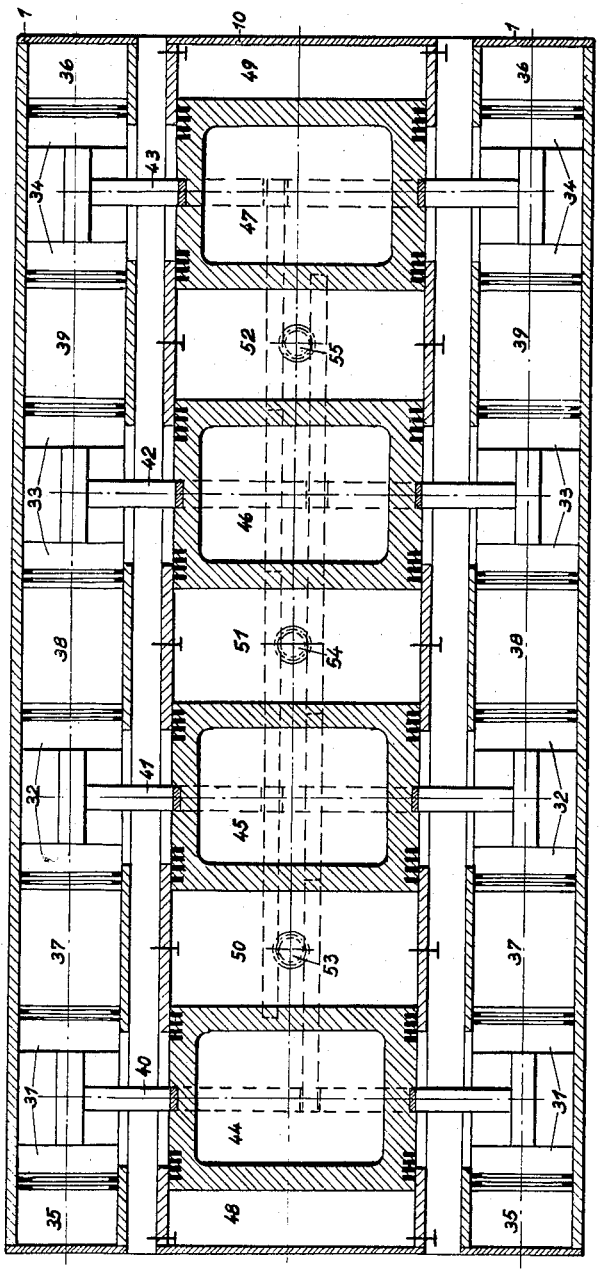
Fig. 4 is a longitudinal section of a compressor unit with four double-acting opposed-motion compressor and engine pistons.

Fig. 4 illustrates an arrangement which, in principle, conforms with that shown in Figs. 1 and 2, and comprises engines 1 arranged in a circular bank with a centrally disposed compressor 10, excepting that four double-acting opposed-motion reciprocating systems are incorporated therein.

The cylinders of the free-piston engines 1 each contain four engine pistons 31, 32, 33 and 34 which divide each cylinder into five separate combustion chambers, namely two, 35 and 36, at the ends, and three, 37, 38 and 39, in the middle. Consequently the transmission of the piston movement requires four radial coupling elements 40, 41, 42 and 43. The free-piston compressor likewise incorporates four compressor pistons 44, 45, 46 and 47 which subdivide the whole of the compressor cylinder into five separate compression chambers in conformity with the division of the engine cylinders, there being two 48, 49 at the ends and three inside compression chambers 50, 51 and 52.

Furthermore, provision is made for three synchronising gears 53, 54 and 55, which ensure synchronisation of all piston systems. The operation of the engines and of the compressor is similar to that already described with reference to Figs. 1 and 2.

Owing to the disposition of the engine pistons in circular banks and the central arrangement of the compressor high performance figures are obtained. Principally the form of construction illustrated in Fig. 4 can deliver a concentrated output which represents an optimum in efficiency, power/weight ratio, and compactness.

The power unit according to the invention is specially suitable for use as a high-pressure stage in gas turbine plant in which the free-piston compressor is called upon to compress the air delivered by an initial turbo-compressor stage to the operational pressure inside the combustion chamber.

The very high intake volume of the turbo-compressor in the low pressure stage is combined with the advantages offered by the piston engine in the form of a free-piston compressor in the high-pressure stage. The high pressure gas turbine cycle is thereby given a tangible structural design basis.

Whereas in conventional gas turbine plants the useful output is reduced by the power absorbed for driving the turbo-compressor which raises the pressure of the air needed for combustion, so that only part of the power delivered by the turbine is actually available at the power take-off of the shaft, the present arrangement in which a separately powered free-piston compressor is incorporated in the cycle makes the whole of the power that is otherwise consumed by the high-pressure stage available for delivery to the load by the turbine shaft.

At the same time the overall efficiency of the plant is considerably increased by the incorporation of the free-piston compressor since, on the one hand, the required combustion air can be compressed to higher pressures so that combustion in the combustion chamber takes place at higher pressures and at higher thermal efficiencies and, on the other hand, the main work of compression is performed by the free-piston compressor powered by free-piston engines working at efficiencies between 43 and 50% compared with efficiencies of gas turbines in conventional plants of roughly only 30%.

The proposed method of operation therefore permits the overall efficiencies of gas turbine plants to be raised to 40% and more.

The invention is also of considerable importance in the industrial generation of compressed air. The invention provides a new foundation upon which the design of economical stationary gas turbine power plants, marine turbine plants, and turbo-power units for aircraft can be based and at the same time it opens up new fields for the further development of reciprocating free-piston units.

Figure 5:
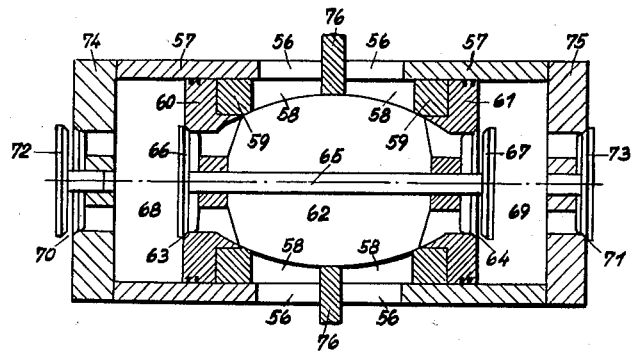
Fig. 5 shows the air admission system in the piston, the admission ports in the cylinder wall and the compressed air outlet valves in the cylinder head.
Figure 6:
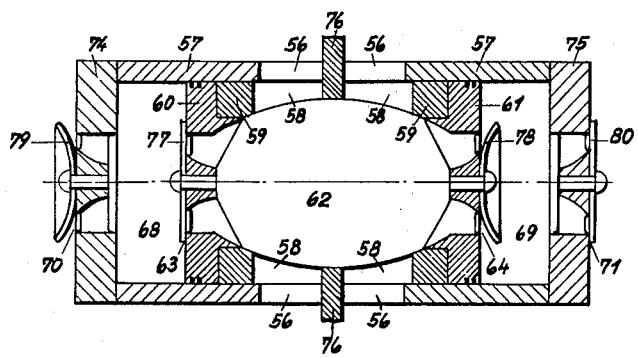
Fig. 6 illustrates the air admission system and the compressed air outlet system in the cylinder head, incorporating circular membranes.

The following description refers to Figs. 5 and 6.

Through air inlet ports 56 in the cylinder wall 57 and the air admission ports 58 in the piston wall 59, as shown in Fig. 5, air is drawn into the cavity 62 formed between the motion-coupled piston crowns 60 and 61, and is then alternately delivered through annular sections 63 and 64 controlled by valves 66 and 67 interconnected by a rod 65, into the cylinder compartments 68 and 69 where it is compressed and then forced through annular sections 70 and 71 controlled by disc valves 72 and 73 in the cylinder heads 74 and 75. The radial coupling elements 76 transmit the motion of the peripherally arranged free-piston engine pistons to the compressor piston.

The arrangement illustrated in Fig. 6 is similar to that of Fig. 5 but the disc valves have been replaced by annular air inlet membranes 77 and 78 in the piston crowns and annular air outlet membranes 79 and 80 in the cylinder heads.

The annular membranes bear against radial ribs in the piston crown and in the cylinder head which prevent unwanted membrane deflection.

The provision of disc valves or of circular membrane valves in the piston crowns and cylinder heads permits large air flow sections to be controlled and considerable air volumes to be handled by the valves.

Another advantage offered by the invention is that only a single control element is required for controlling large flow sections and the admission and delivery of the air through the flow sections is in the axial direction.

Unlike conventional air admission valves in the cylinder head the operation of the air admission control elements according to the invention is effected when cold, not only by the pressure differences that arise but also by the accelerations set up as a result of the reversal of the direction of piston travel in the two dead centre positions, so that opening and closing of the control sections is a very positive action which permits very high delivery efficiencies of the compressor to be achieved.

The following description refers to Figs. 7 to 10 of the drawings.

Figures 7, 8, 9, 10:
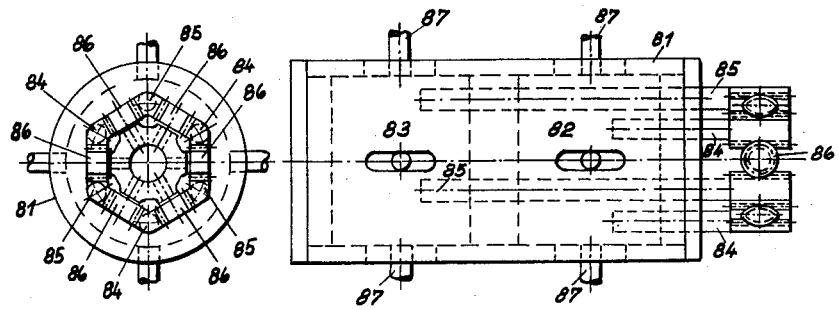
Fig. 7 shows the arrangement of racks inside the compressor cylinder.
Fig. 8 is a longitudinal section of the arrangement shown in Fig. 7.
Fig. 9 is an arrangement in which the racks are disposed outside the compressor cylinder.
Fig. 10 is a longitudinal section of the arrangement according to Fig. 9.

The opposed-motion pistons 82 and 83 arranged in the compressor cylinder 81 shown in Figs. 7 and 8 are fitted with racks 84 and 85 provided outside the compression cylinder with teeth which mesh with pinions 86 arranged between them. The racks 84 and 85 are circularly arranged and work in opposed motion, the pinions 86 being likewise disposed in a circle and engaging on one side a rack 84 and on the other a rack 85. Differential forces due to differences in piston friction or to differences in the power transmitted by the radial coupling elements 87 are therefore transferred by the pistons to a plurality of pinions and thus balanced, so that synchronism of the piston motions is assured.

In Figs. 9 and 10 the synchronising racks are arranged outside the compressor cylinder.

The radial coupling elements 87 which are motion-coupled with the two opposed-motion pistons 82 and 83, and which are driven by the engine pistons, carry axially arranged opposed-motion racks 88 and 89 which work over pinions 90 disposed between them on the cylinder casing. As described, synchronism of the two compressor pistons and at the same time of the driven pistons is thus assured.

Synchronising racks and pinions are concentrically arranged around the cylinder casing and synchronise the entire unit through a plurality of synchronising elements.

Figure 11:
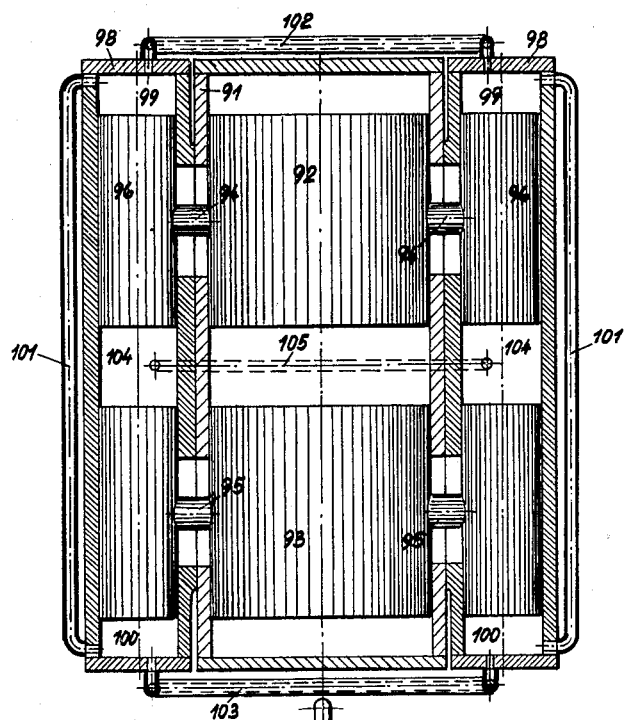
Fig. 11 is a pressure-balanced compressor unit in longitudinal section.
Figure 12:
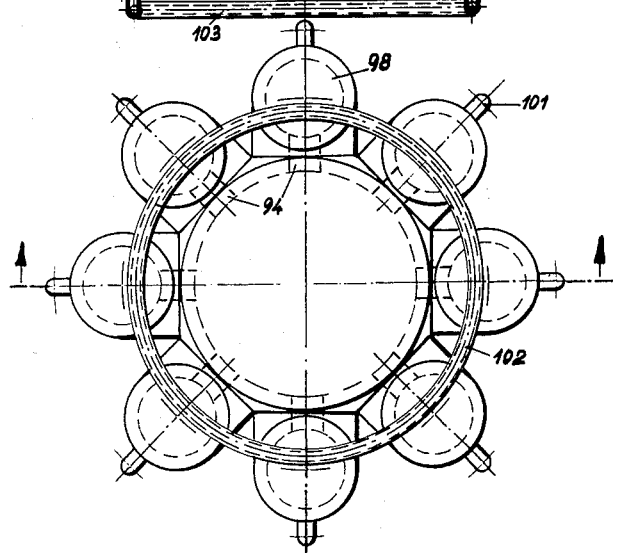
Fig. 12 is a cross section of the pressure-balanced compressor unit.

Finally, reference is made to Figs. 11 and 12, which illustrate a double-acting opposed-motion free-piston compressor with a centrally disposed compressor comprising a cylinder 91 and compressor pistons 92 and 93, driven by radial coupling elements 94 and 95 by the engine pistons 96 and 97 of the free-piston engine 98. The outer combustion chambers 99 and 100 are in communication through channels 101.

The combustion chambers 99 on the outside of the unit are in communication through a pipe annulus 102 and chambers 100 are similarly in comunication through a pipe annulus 103. Moreover, the inner combustion chambers 104 are in communication through a pipe annulus 105.

Since pressure fluctuations are propagated at sonic speed any pressure differences between the relative combustion chambers are therefore largely equalised so that the combustion gas pressures acting on all the pistons will be substantially equal.

Any remaining differences can then easily be taken up by the synchronising gear.

I claim:
1. A free-piston compressor system comprising a free-piston compressor including a cylindrical compressor wall having slits therein and having a plurality of compressor pistons disposed therein forming a plurality of compression chambers, a plurality of double acting free-piston engines disposed radially about said compressor and including cylinders having slots therethrough, a plurality of engine pistons disposed in said cylinders forming combustion chambers, and radial coupling elements extending through said slits and said slots interconnecting said compressor pistons and said engine pistons.

2. A free-piston compressor system according to claim 1 wherein said compressor has an air admission and delivery control system comprising longitudinal ports in the compressor wall through which air enters and passes to cavity formed between two motion-coupled piston crowns of a double-acting compressor piston, the air being admitted into the compression chambers inside the cylinders through air admission control means disposed in said piston crowns.

3. A free-piston compressor system according to claim 2 characterized in that the two air admission control elements in said piston crowns are motion-coupled in such a manner that the control openings of the two control elements open and shut in alternation during the suction and compression strokes respectively.

4. A free-piston compressor system according to claim 3 characterized in that the control elements in the piston crowns comprise single circular membrane valves.

5. A free-piston compressor system according to claim 3 characterized in that compressed air delivery elements are provided in the cylinder heads said elements comprising circular membrane valves.

6. A free-piston compressor system according to claim 3 characterized in that the control elements in the piston crowns comprise multi-part circular membrane valves.

7. A free-piston compressor system comprising a free-piston compressor including a cylindrical compressor wall having slits therein and having a plurality of compressor pistons disposed therein forming a plurality of compression chambers, a plurality of double acting free-piston engines disposed radially about said compressor and including cylinders having slots therethrough, a plurality of engine pistons disposed in said cylinders forming combustion chambers, radial coupling elements extending through said slits and said slots interconnecting said compressor pistons and said engine pistons, each of said compressor pistons including a pair of piston crowns having a cavity therebetween, said compressor including an air admission and delivery control system, said compressor wall having valve means connected to said cavity, and control means connecting said cavity with said compression chambers during exhaust strokes of each compressor piston while said control means disconnect said cavity with said compression chambers during compression strokes of each compressor piston.

References Cited in the file of this patent

UNITED STATES PATENTS 2,578,439    Mercier et al. _____ Dec. 11, 1951

FOREIGN PATENTS 102,823    Switzerland _____ Nov. 27, 1922
716,802    Great Britain _____ Oct. 13, 1954